(12) United States Patent
Watanabe et al.

(10) Patent No.: US 11,565,266 B2
(45) Date of Patent: Jan. 31, 2023

(54) AUTOMATIC ANALYZER

(71) Applicant: HITACHI HIGH-TECHNOLOGIES CORPORATION, Tokyo (JP)

(72) Inventors: Midori Watanabe, Tokyo (JP); Yoshiaki Saito, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 470 days.

(21) Appl. No.: 16/632,635

(22) PCT Filed: Aug. 6, 2018

(86) PCT No.: PCT/JP2018/029407
§ 371 (c)(1),
(2) Date: Jan. 21, 2020

(87) PCT Pub. No.: WO2019/031451
PCT Pub. Date: Feb. 14, 2019

(65) Prior Publication Data
US 2020/0164378 A1  May 28, 2020

(30) Foreign Application Priority Data
Aug. 9, 2017  (JP) .............................. JP2017-154816

(51) Int. Cl.
*B01L 3/00* (2006.01)
*G01N 35/00* (2006.01)
*G01N 35/02* (2006.01)

(52) U.S. Cl.
CPC .......... *B01L 3/527* (2013.01); *G01N 35/0095* (2013.01); *G01N 35/025* (2013.01); *B01L 2200/04* (2013.01); *B01L 2200/143* (2013.01)

(58) Field of Classification Search
CPC ........ G01N 2035/00673; G01N 35/02; G01N 2035/0443; G01N 35/0092;
(Continued)

(56) References Cited

U.S. PATENT DOCUMENTS 3,713,771 A * 1/1973 Taylor ................ A61B 10/0096
422/534
5,282,149 A * 1/1994 Grandone ........ G05B 19/41865
702/19
(Continued)

FOREIGN PATENT DOCUMENTS

JP    2005-037171 A    2/2005
JP    2005-214683 A    8/2005
(Continued)

OTHER PUBLICATIONS

International Search Report of PCT/JP2018/029407 dated Sep. 25, 2018.
(Continued)

*Primary Examiner* — Shogo Sasaki
(74) *Attorney, Agent, or Firm* — Mattingly & Malur, PC

(57) ABSTRACT

The automatic analyzer includes a light source 4a to perform measurement, a spectrophotometer 4, a reagent disk 9 to store a reagent bottle 10 in which the reagent is stored, a carriage device to carry the reagent bottle 10 to the reagent disk 9, a reagent preparation unit to perform preparatory operations required before the regent bottle 10 is used, and a control unit 21 to schedule the preparatory operations by the reagent preparation unit and the carriage operation by the carriage device such that the reagent bottle 10 is carried to the reagent disk 9 immediately after an operation accompanied with analysis by the light source 4a and the spectrophotometer 4 is suspended or ends.

16 Claims, 9 Drawing Sheets

(58) Field of Classification Search
CPC ....... G01N 2035/0406; G01N 35/1002; G01N 35/025; G01N 35/0095; G01N 35/04; G01N 2035/0465; G01N 2035/00811; G01N 2035/0484; G01N 35/00722; G01N 35/10; G01N 2035/0413; G01N 35/026; B01L 2200/143; B01L 3/527; B01L 2200/04

See application file for complete search history.

(56) References Cited

U.S. PATENT DOCUMENTS

| | | | | |
|---|---|---|---|---|
| 5,576,215 | A * | 11/1996 | Burns | G01N 35/0092 |
| | | | | 422/63 |
| 2004/0186360 | A1 * | 9/2004 | Suzuki | G01N 35/026 |
| | | | | 356/39 |
| 2005/0175503 | A1 | 8/2005 | Shiba et al. | |
| 2005/0207938 | A1 | 9/2005 | Hanawa et al. | |
| 2010/0107744 | A1 * | 5/2010 | Fukuda | G01N 35/0092 |
| | | | | 422/67 |
| 2013/0280130 | A1 | 10/2013 | Sarwar et al. | |
| 2014/0356233 | A1 | 12/2014 | Hagiwara et al. | |
| 2016/0202854 | A1 * | 7/2016 | Minato | G01N 30/24 |
| | | | | 715/773 |
| 2017/0153261 | A1 * | 6/2017 | Chida | B25J 15/0038 |
| 2018/0080949 | A1 * | 3/2018 | Jost | G06Q 10/06316 |
| 2019/0277869 | A1 * | 9/2019 | Stein | G01N 35/0099 |
| 2019/0344262 | A1 * | 11/2019 | Martin | G01N 35/04 |

FOREIGN PATENT DOCUMENTS

| | | |
|---|---|---|
| JP | 2008-020361 A | 1/2008 |
| JP | 2009-036723 A | 2/2009 |
| JP | 2012-008053 A | 1/2012 |
| WO | 2012/073877 A1 | 6/2012 |

OTHER PUBLICATIONS

Extended European Search Report received in corresponding European Application No. 18844718.9 dated Mar. 15, 2021.

* cited by examiner

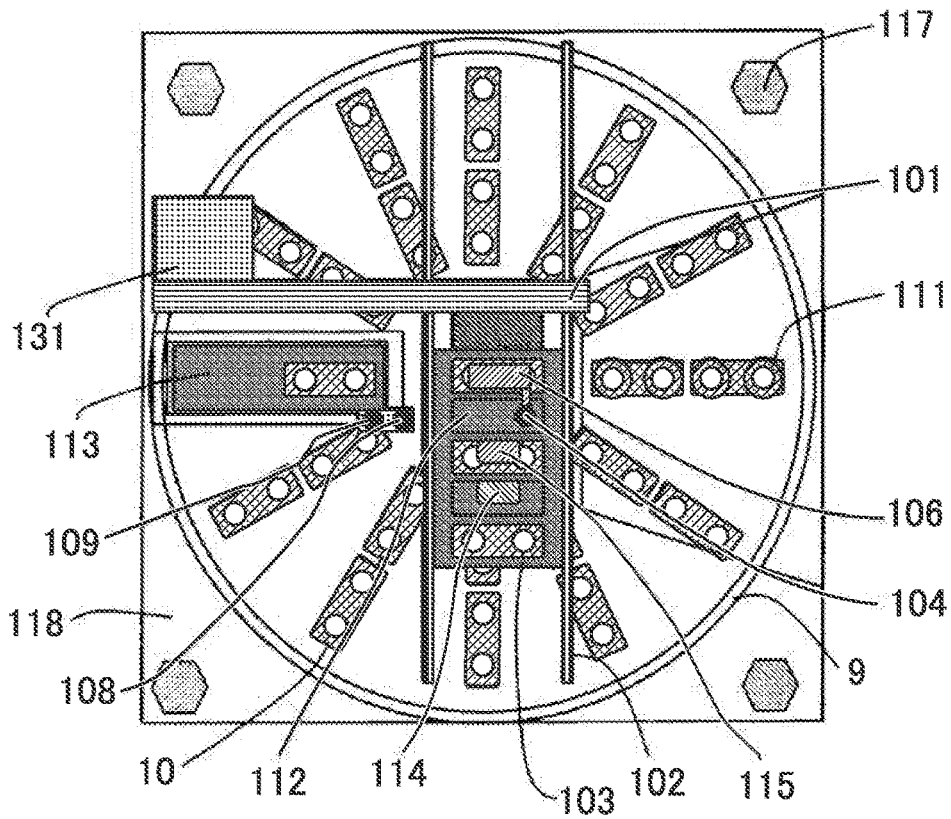

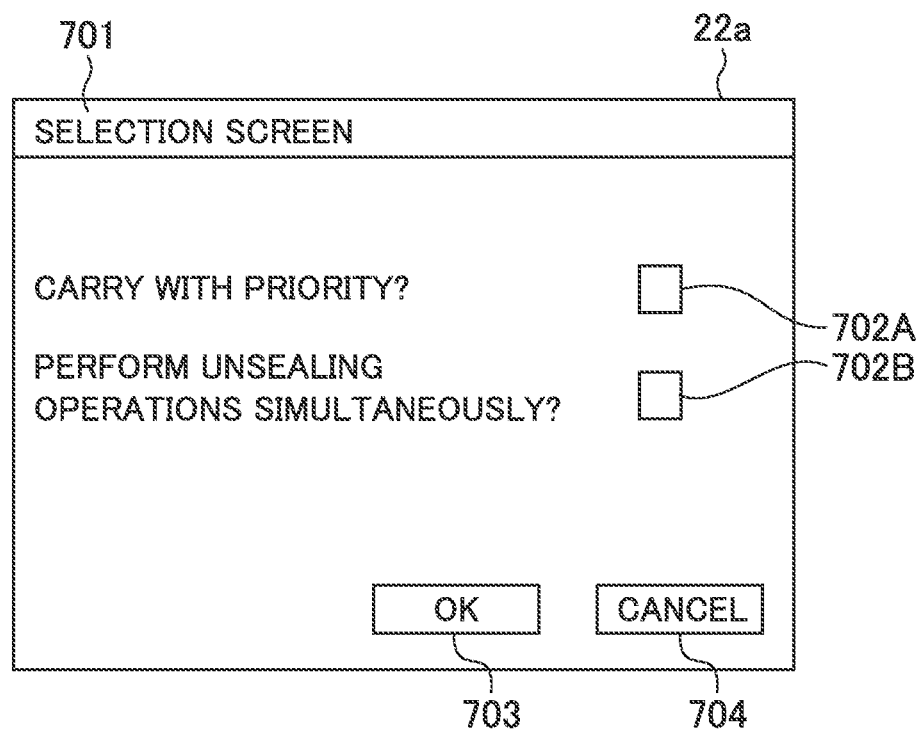

AUTOMATIC ANALYZER

TECHNICAL FIELD

The present invention relates to an automatic analyzer that analyzes a patient sample (hereunder referred to as sample) such as blood, urine, or the like quantitatively and qualitatively.

BACKGROUND ART

An automatic analyzer in which two reagent containers each are placed in a row in a replenishment reagent storage that is a second reagent storage means for replenishment over a reagent disk, a plurality of reagent containers can be mounted in the replenishment reagent storage, rails are arranged above the replenishment reagent storage, and rails, a reagent retention means movable in three axial directions, and a reagent cap opening means are installed at the rails is described in Patent Literature 1 as an example of an automatic analyzer that: reduces burdens on an operator caused by operations such as reagent registration, reagent replacement, etc.; does not cause shortage of a reagent during analysis; and minimizes analysis suspensions.

As an example of an automatic analyzer that can eliminate manual operations of extracting and retracting a reagent container from and into a reagent storage and reduce the burdens of an operator, an automatic analyzer having a carriage device is described in Patent Literature 2. The carriage device includes: a gripping and carrying unit having a gripping device to grip a reagent container and an elevating member that supports the gripping device so as to be movable in a predetermined direction and is movable vertically; a transfer unit having a container support to support a plurality of reagent containers and a guide to guide the transfer of the container support between the vicinity of a reagent storage and a disposal position; and a carriage control unit to control the operations of the gripping and carrying unit and the transfer unit. The carriage device carries the reagent container between the reagent storage and the disposal position by the gripping and carrying unit and the transfer unit, and extracts and retracts the reagent container from and into the reagent storage.

CITATION LIST

Patent Literature

Patent Literature 1: Japanese Unexamined Patent Application Publication No. 2005-037171
Patent Literature 2: Japanese Unexamined Patent Application Publication No. 2008-020361

SUMMARY OF INVENTION

Technical Problem

For example, an automatic analyzer such as a biochemical automatic analyzer, an immune automatic analyzer, or the like is required to place reagent bottles according to the measurement items of a sample in the analysis apparatus. When reagent bottles are placed in the analysis apparatus, generally the reagent bottles are placed in a reagent storage manually by an operator.

In general, reagent bottles are replaced basically when the analysis apparatus does not measure and is in standby. The reason is that the analysis apparatus is working during analysis and hence an operator cannot access a reagent storage and thus can neither take out nor place a reagent bottle. As a result, a reagent bottle having reduced a residual quantity during analysis cannot be replenished until the measurement finishes, waiting time of an operator occurs, hence operability deteriorates, and loss of time caused by measurement stop occurs.

To cope with the problem, such an automatic analyzer of automatically replacing reagent bottles as describe in Patent Literatures 1 and 2 is currently used. In such an automatic analyzer, when reagent replenishment is required, preparatory operation such as cover opening operation of piercing the lid of a reagent bottle and bar code reading operation is performed and replacement is performed with as little influence as possible on measurement by using free time between measurements.

In Patent Literature 1 for example, a reagent storage for retaining reagent bottles and a reagent carrier means are prepared in advance, the reagent bottles are taken out one by one from the reagent storage automatically when the residual quantity of a reagent in a reagent disk storing the reagent used for analysis reduces, preparatory operation of cover opening and bar code reading is performed, and then the reagent bottles are carried in the reagent disk. This makes it possible: to reduce burdens on an operator caused by operations such as reagent registration, reagent replacement, etc.; not to cause shortage of a reagent during analysis; and to minimize analysis suspensions.

Further, in Patent Literature 2, a reagent gripping and carrying unit is prepared and operations of extracting and retracting a reagent bottle from and into a reagent storage can be performed with a carrier device by carrying the reagent bottle between a storage unit to store a reagent used for analysis and a reagent bottle disposal position which an operator can access. This makes it possible to: eliminate manual operations of extracting and retracting a reagent bottle from and into a storage unit; and reduce the burdens of an operator.

A rate of reagent consumption however increases as an analysis speed of an analysis apparatus increases. There arises therefore a need to replace more reagent bottles at once. In Patent Literatures 1 and 2 stated above, since carriage is performed between measurements, only one reagent can be carried and replaced in a one-time plan and it is necessary to wait for intervals of analysis many times when multiple reagents are replaced. When many reagent bottles are required to be replaced therefore, it may possibly take a long time to replace all reagent bottles.

In Patent Literature 1 further, it is necessary to wait for an interval of measurement after the cover of a reagent bottle is opened but, when the reagent bottle cannot be placed in a reagent storage soon, a problem of a reagent deteriorating or evaporating with the lapse of time may possibly occur. There is a request to open a cover immediately before a reagent bottle is replaced if possible.

With simple replacement at an interval between measurements however, since an analysis plan itself is required to be changed, the problems of influence on succeeding analysis, malfunction due to plan change, and complicated operation correction work in the event of specification change may possibly occur. Further, another problem is that there is the risk of requiring an analysis item under analysis to be reanalyzed when a carriage mechanism stops by inappropriate use of a reagent bottle or malfunction of the carrier mechanism.

The present invention provides an automatic analyzer that can inhibit a carried reagent more than before from deteriorating when the reagent is carried in the analysis apparatus automatically, and make analysis stop as short as possible.

Solution to Problem

The present invention includes a plurality of means for solving the above problems and an example of the means is an automatic analyzer of dispensing a sample and a reagent respectively in a reaction vessel, reacting the sample with the reagent, and measuring the reacted liquid, the automatic analyzer comprising: an analysis system to perform the measurement; a reagent storage unit to store a reagent bottle containing the reagent; a carriage device to carry the reagent bottle to the reagent storage unit; a reagent preparation unit to perform preparatory operation required before the reagent bottle is used; and a control unit to schedule the preparatory operation by the reagent preparation unit and carriage operation by the carriage device so that the reagent bottle may be carried to the reagent storage unit immediately after an operation accompanied with analysis by the analysis system is suspended or ends.

Advantageous Effects of Invention

The present invention makes it possible to: inhibit a carried reagent more than before from deteriorating when the reagent is carried in an analysis apparatus automatically; and make analysis stop as short as possible. Problems, configurations, and effects other than the above descriptions will be obvious from the explanations of the following embodiments.

BRIEF DESCRIPTION OF THE DRAWINGS

FIG. 7 is a schematic view to explain one example of the autoloader mechanism provided on the automatic analyzer embodied in the present invention.

FIG. 8 is a view illustrating another example of the scheduling of the reagent preparation and the reagent bottle carriage according to the automatic analyzer embodied in the present invention.

FIG. 9 is a view illustrating another example of the scheduling of the reagent preparation and the reagent bottle carriage according to the automatic analyzer embodied in the present invention.

FIG. 10 is a view illustrating another example of the scheduling of the reagent preparation and the reagent bottle carriage according to the automatic analyzer embodied in the present invention.

FIG. 11 is a view illustrating another example of the scheduling of the reagent preparation and the reagent bottle carriage according to the automatic analyzer embodied in the present invention.

FIG. 12 is a view illustrating one example of the selection screen as to whether or not preparatory operation control is performed, which screen is displayed on the display unit of the automatic analyzer embodied in the present invention.

DESCRIPTION OF EMBODIMENTS

Figure 1:
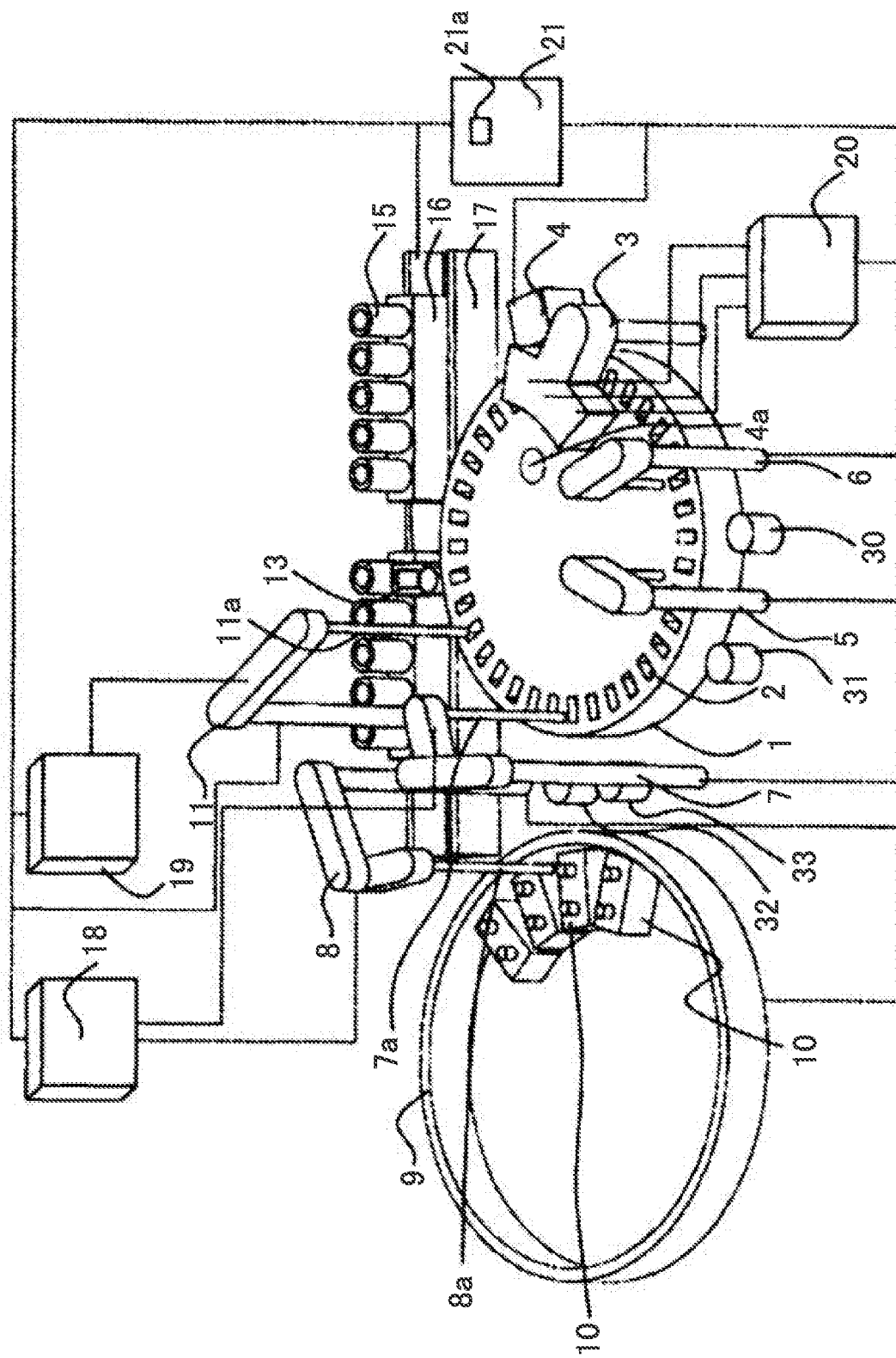
FIG. 1 is a view schematically showing the entire arrangement of the automatic analyzer.
Figure 13:
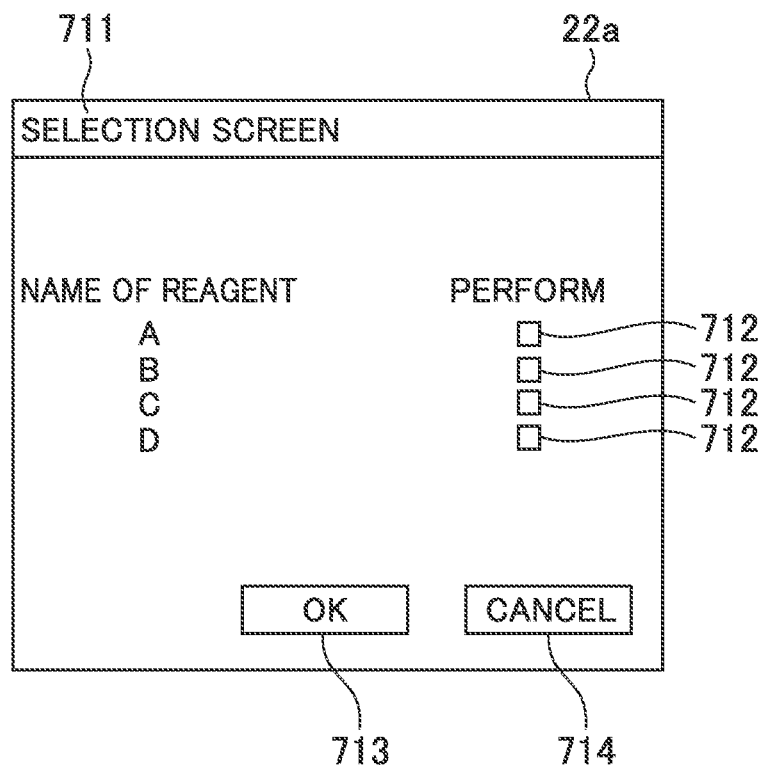
FIG. 13 is a view illustrating one example of the selection screen as to whether or not preparatory operation control is performed for each reagent bottle, which screen is displayed on the display unit of the automatic analyzer embodied in the present invention.

Embodiments of an automatic analyzer according to the present invention are explained in reference to FIGS. 1 to 13. FIG. 1 is a view schematically showing the entire arrangement of an automatic analyzer. FIGS. 2 to 4 and 7 are schematic views explaining an example of an autoloader mechanism installed in an automatic analyzer according to the present embodiment. FIG. 5 is a flowchart explaining reagent bottle carriage operation of an automatic analyzer according to the present embodiment. FIGS. 6 and 8 to 11 are views explaining the scheduling of the reagent preparation and the reagent bottle carriage according to the automatic analyzer embodied in the present invention. FIG. 12 is a view illustrating one example of the selection screen as to whether or not preparatory operation control is performed, which screen is displayed on the display unit of the automatic analyzer embodied in the present invention. FIG. 13 is a view illustrating one example of the selection screen as to whether or not preparatory operation control is performed for each reagent bottle, which screen is displayed on the display unit of the automatic analyzer embodied in the present invention.

Firstly, an outline of an automatic analyzer is explained in reference to FIG. 1.

Figure 2:
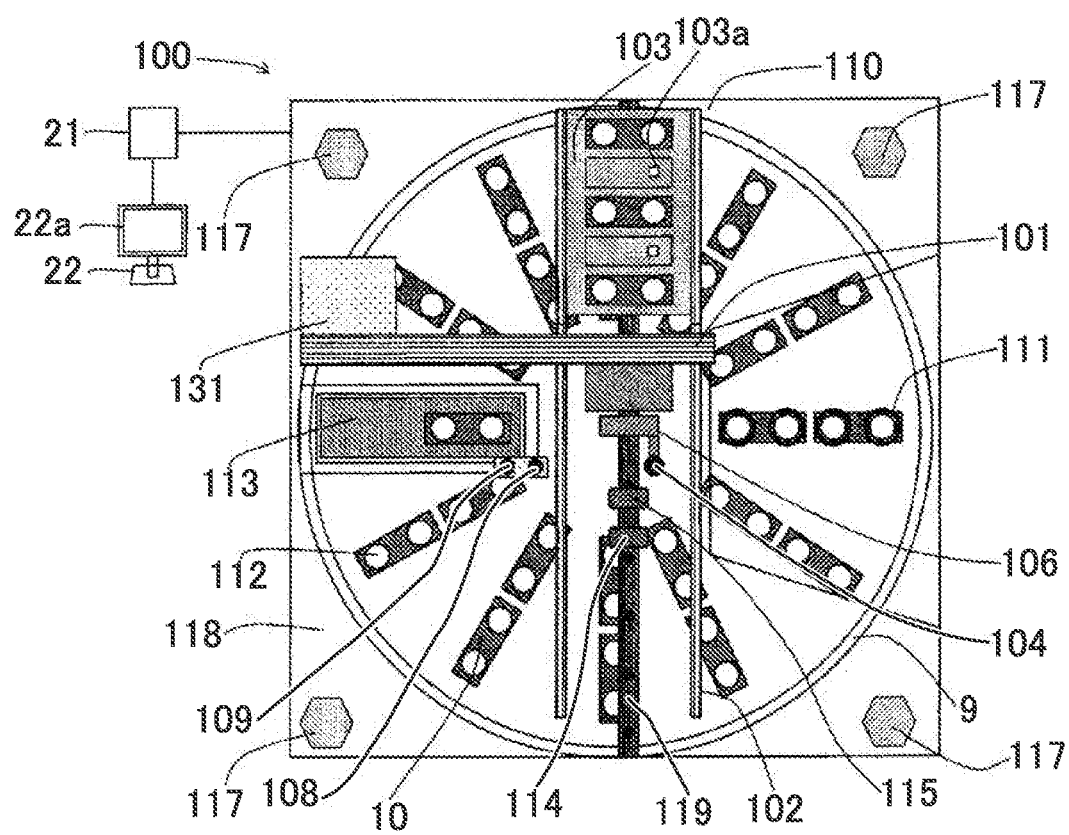
FIG. 2 is a schematic view explaining an autoloader mechanism provided on the automatic analyzer embodied in the present invention.

In FIG. 2, an automatic analyzer: is an analysis apparatus of dispensing a sample and a reagent respectively in each of a plurality of reaction vessels 2, reacting the sample with the reagent, and measuring the reacted liquid; and has a reaction disk 1, a reagent disk (reagent storage unit) 9, a sample carriage mechanism 17, reagent dispensing mechanisms 7 and 8, a syringe for reagent 18, a sample dispensing mechanism 11, a syringe for sample 19, a cleansing mechanism 3, a light source 4a, a spectrophotometer 4, stirring mechanisms 5 and 6, a cleansing pump 20, cleansing tanks 13, 30, 31, 32, and 33, a control unit 21, and an autoloader mechanism 100 (refer to FIG. 2 and other drawings). In the present embodiment, an analysis system comprises the light source 4a and the spectrophotometer 4.

Reaction vessels 2 are arranged in a circle on the reaction disk 1. The sample carriage mechanism 17 to move a rack 16 loaded with sample containers 15 is installed near the reaction disk 1.

The sample dispensing mechanism 11 that can rotate and move vertically is installed between the reaction disk 1 and the sample carriage mechanism 17 and has a sample probe 11a. The syringe for sample 19 is connected to the sample probe 11a. The sample probe 11a moves while drawing an arc around a rotation axis and dispenses a sample from a sample container 15 to a reaction vessel 2.

The reagent disk 9 is a storage unit that can be loaded in a circle with a plurality of reagent bottles 10 containing reagents. The reagent disk 9 is kept cold and covered with a cover having reagent probe suction ports 111 (refer to FIG. 2) which reagent probes 7a and 8a of the reagent dispensing mechanisms 7 and 8 access when reagents are dispensed into reaction vessels 2 and an open/close cover 113 (refer to FIG. 2) for carrying the reagent bottles 10 into the reagent disk 9.

Meanwhile, although the reagent disk 9 is configured so as to be able to store reagents used for analysis and dispense reagents from the reagent probe suction ports 111 and carry and unload the reagent bottles 10 from the open/close cover 113 at one place, it doesn't have to be one place and they may be dispensed, carried, and unloaded at multiple places.

The reagent dispensing mechanisms 7 and 8 that can rotate and move vertically are installed between the reaction disk 1 and the reagent disk 9 and have the reagent probes 7a and 8a respectively. The syringe for reagent 18 is connected to the reagent probes 7a and 8a. The reagent probes 7a and 8a move while drawing arcs around rotation axes, access the interior of the reagent disk 9 from the reagent probe suction ports 111, and dispense reagents from the reagent bottles 10 to the reaction vessels 2.

The cleansing mechanism 3, the light source 4a, the spectrophotometer 4, and the stirring mechanisms 5 and 6 are further arranged around the reaction disk 1. The cleansing pump 20 is connected to the cleansing mechanism 3. The cleansing tanks 13, 30, 31, 32, and 33 are installed in operating ranges of the reagent dispensing mechanisms 7 and 8, the sample dispensing mechanism 11, and the stirring mechanisms 5 and 6, respectively. Samples such as blood are contained in the sample containers 15, loaded on the rack 16, and carried by the sample carriage mechanism 17. Further, the mechanisms are connected to the control unit 21.

The control unit 21 comprises a computer and the like, controls the operations of the mechanisms in the automatic analyzer, and performs arithmetic processing for obtaining the concentration of a predetermined component in a liquid sample such as blood, urine, or the like.

Further, the control unit 21 according to the present embodiment schedules the plan of preparatory operation to a reagent bottle 10 and the plan of carrying the reagent bottle 10 so that the reagent bottle 10 may be carried to the reagent disk 9 immediately after the suspension or the finish of operation accompanied with analysis by the light source 4a and the spectrophotometer 4. In the present embodiment, "immediately after the suspension or the end of operation accompanied with analysis" that is the timing of starting carriage is defined as the end of an analysis plan at which the whole analysis of a sample dispensed already ended. The details of the scheduling will be described later.

Meanwhile, the timing of starting carriage: is not limited to the end of an analysis plan at which the whole analysis of a sample dispensed already is ended; and may be an arbitrary timing after the dispensing of a reagent from a reagent bottle 10 ends and the operation (rotation) of the reagent disk 9 ends. For example, the timing may be the timing immediately after the rotation of the reagent disk 9 stops, the timing when a predetermined period of time or longer has elapsed since rotation stopped, or another timing.

A display unit 22 is a device having a display screen 22a providing information and the like to an operator, and displays the result of the concentration of a predetermined component in a liquid sample such as blood, urine, or the like computed at the control unit 21, for example. Further, in the display unit 22 according to the present embodiment, various setting screens such as a selection screen 701 (refer to FIG. 12) and a selection screen 711 (refer to FIG. 13) are displayed on the display screen 22a. The details will be described later.

The above is the general configuration of the automatic analyzer.

The analysis operation of a test sample by the automatic analyzer stated above is generally performed in the following order.

Firstly, a sample in a sample container 15 loaded on the rack 16 carried near the reaction disk 1 by the sample carriage mechanism 17 is dispensed into a reaction vessel 2 on the reaction disk 1 by the sample probe 11a of the sample dispensing mechanism 11. Successively, a reagent used for analysis is dispensed by the reagent dispensing mechanisms 7 and 8 from a reagent bottle 10 on the reagent disk 9 into the reaction vessel 2 into which the sample has been dispensed previously. Successively, the mixed liquid of the sample and the reagent in the reaction vessel 2 is stirred by the stirring mechanism 5.

Successively, light emitted from the light source 4a is transmitted through the reaction vessel 2 containing the mixed liquid and the intensity of the transmitted light is measured by the spectrophotometer 4. The intensity of the light measured by the spectrophotometer 4 is transmitted to the control unit 21 through an A/C converter and an interface. Then the control unit 21 performs calculation, obtains the concentration of a predetermined component in a liquid sample such as blood, urine, or the like, and displays the result on the display screen 22a of the display unit 22 and the like.

The configuration of an autoloader mechanism 100 is explained hereunder in reference to FIG. 2 and succeeding drawings.

In general, a lid 112 is attached to the position of the reagent probe suction port of a reagent bottle 10 in order to seal the interior and the reagent bottle 10 is placed in the analysis apparatus by detaching the lid 112 when the reagent bottle 10 is set in the automatic analyzer. In recent years however, there is a cover opening method of forming a hole of a notched shape in a lid 112, inserting the reagent probes 7a and 8a into the notched part, and sucking a reagent in a reagent bottle 10. Since the opening of the lid 112 forms a small notch, the contact of the reagent with outside air is minimized and the deterioration of the reagent is improved more than before. On this occasion, as long as an operator places an unopened new reagent bottle 10 in the automatic analyzer, a hole is made in the lid 112 of the reagent bottle 10 and the reagent bottle 10 is placed in the reagent disk 9 automatically. The mechanism of carrying and unloading a reagent bottle 10 to the reagent disk 9 automatically regardless of the existence or nonexistence of detaching the lid 112 and forming a notch in the lid 112 is the autoloader mechanism 100.

The autoloader mechanism 100 is arranged over the reagent disk 9 and is configured as shown in FIG. 2 and other drawings. In FIG. 2, the autoloader mechanism 100: has a reagent placement unit 103, a reagent placement mechanism 102, a reagent carriage mechanism (carriage unit) 101, a storage 110, a needle cleansing tank 108, a needle drying port 109, a bottle orientation detection sensor 114, an RFID sensor 115, stays 117, a metallic plate 118, and others; and is configured so as to attach those mechanisms to the single metallic plate 118 excluding the stays 117.

Figure 3:
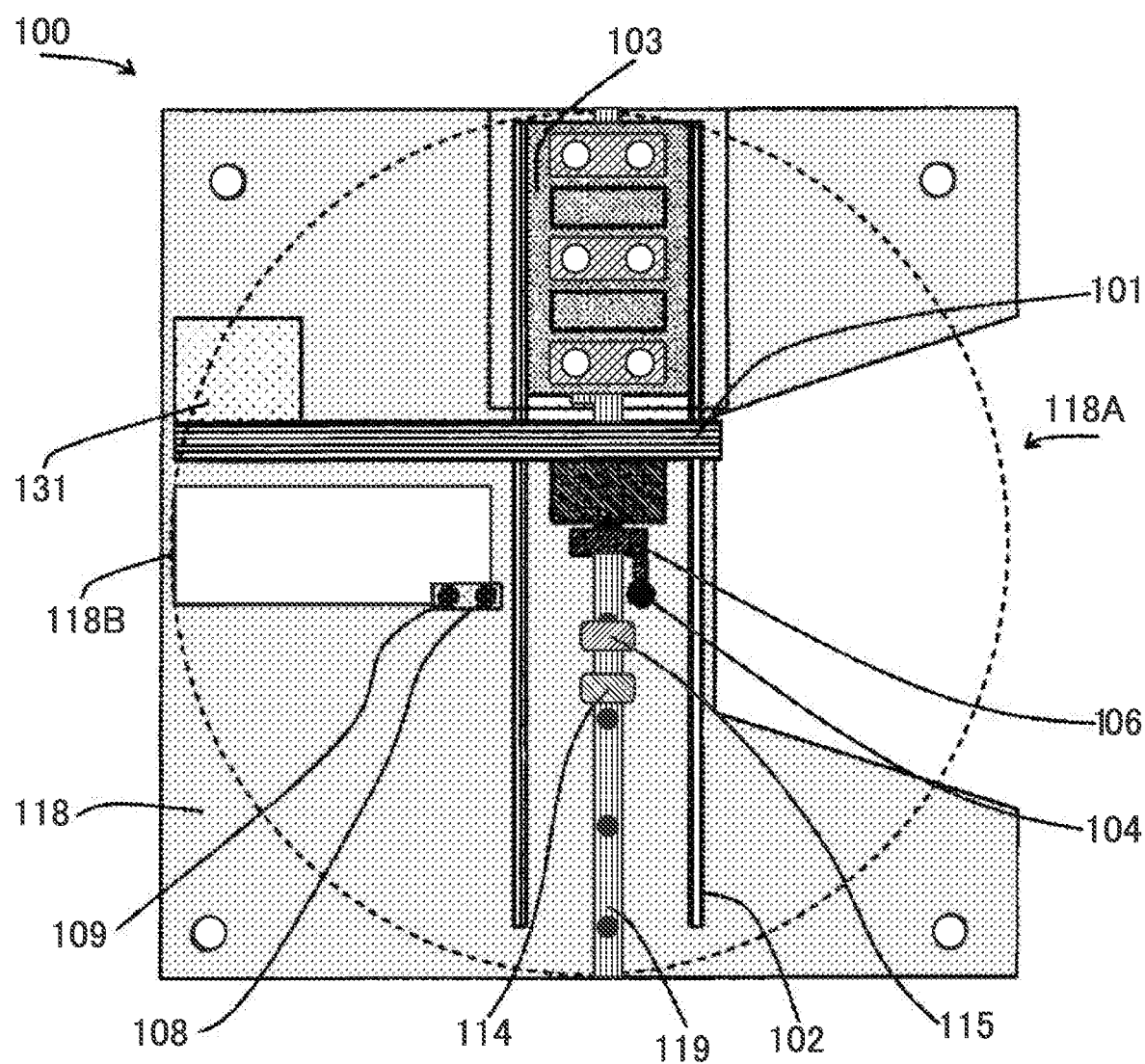
FIG. 3 is a schematic view explaining an autoloader mechanism provided on the automatic analyzer embodied in the present invention.

Apertures 118A and 118B are formed in the metallic plate 118 as shown in FIG. 3.

The space of the aperture 118A is a place where the reagent probes 7a and 8a of the reagent dispensing mechanisms 7 and 8 descend to a reagent bottle 10 in the reagent disk 9 and suck a reagent during operation. By forming the aperture 118A, the operations of the autoloader mechanism 100 and the reagent dispensing mechanisms 7 and 8 can be prevented from interfering with each other. In other words, most operations of the autoloader mechanism 100 can be performed independently without synchronizing with analysis operations.

The space of the aperture 118B is a place for carrying a reagent bottle 10 to the reagent disk 9 by a gripper mechanism 106 of the reagent carriage mechanism 101 and is formed at a place nearly identical to a place where the open/close cover 113 is located.

Returning to FIG. 2, the metallic plate 118 is configured so as to be supported by the four stays 117. The four stays 117 are arranged on the outer circumferential side of the reagent disk 9 over the automatic analyzer and the height of the stays 117 is higher than the height of attaching a cover above the reagent disk 9. That is, the autoloader mechanism 100 is configured so as to be arranged above the reagent disk 9. Meanwhile, the number of the stays 117 is not limited to four and doesn't matter as long as the balance of the mechanism is taken into consideration.

The open/close cover 113 is a cover to prevent cool air inside the refrigerated reagent disk 9 from escaping and is usually in a closed state. The open/close cover 113 opens so as to be able to carry and unload a reagent bottle 10 to the reagent disk 9 when the reagent carriage mechanism 101 accesses the reagent disk 9.

Figure 4:
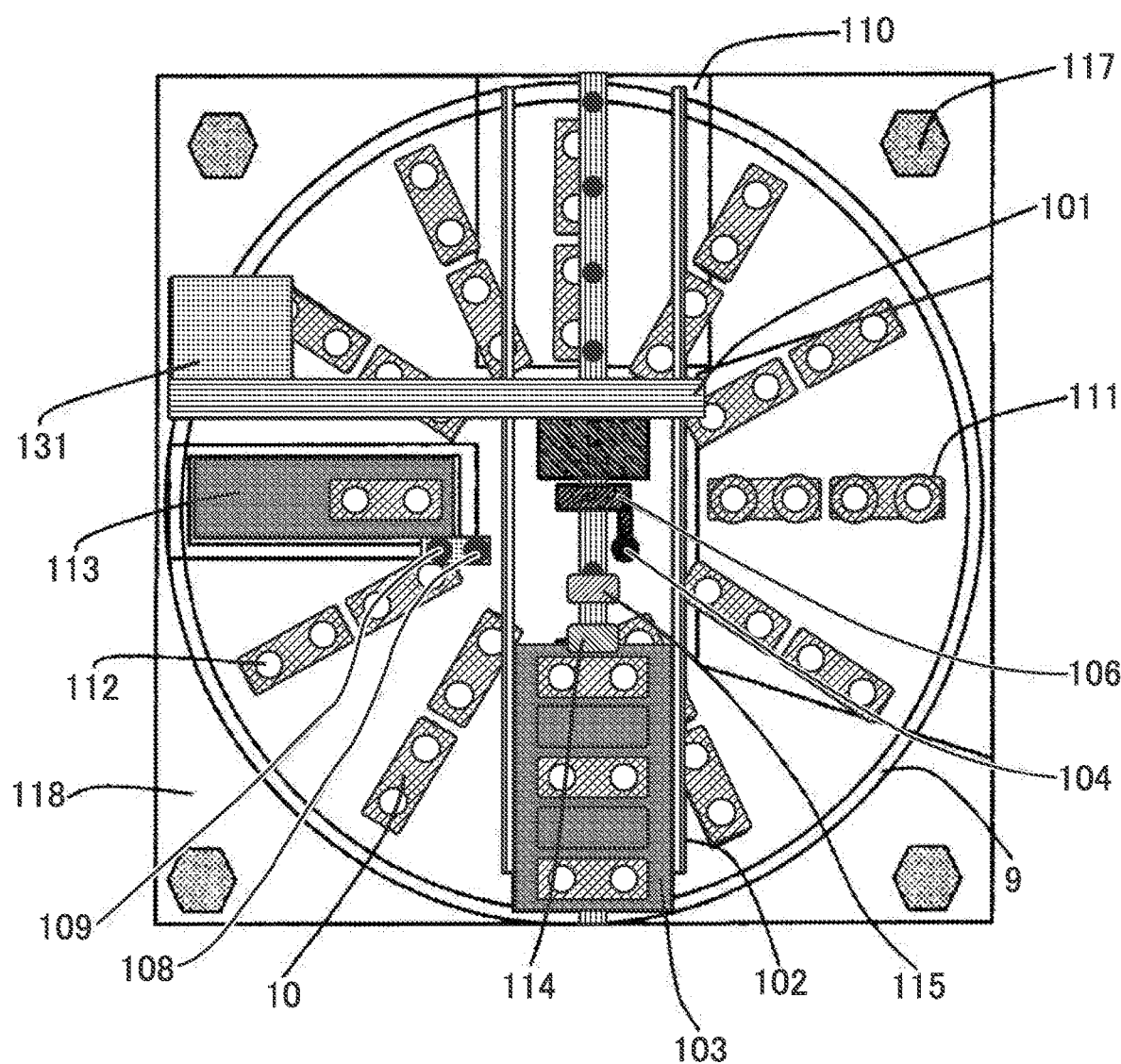
FIG. 4 is a schematic view explaining an autoloader mechanism provided on the automatic analyzer embodied in the present invention.
Figure 5:
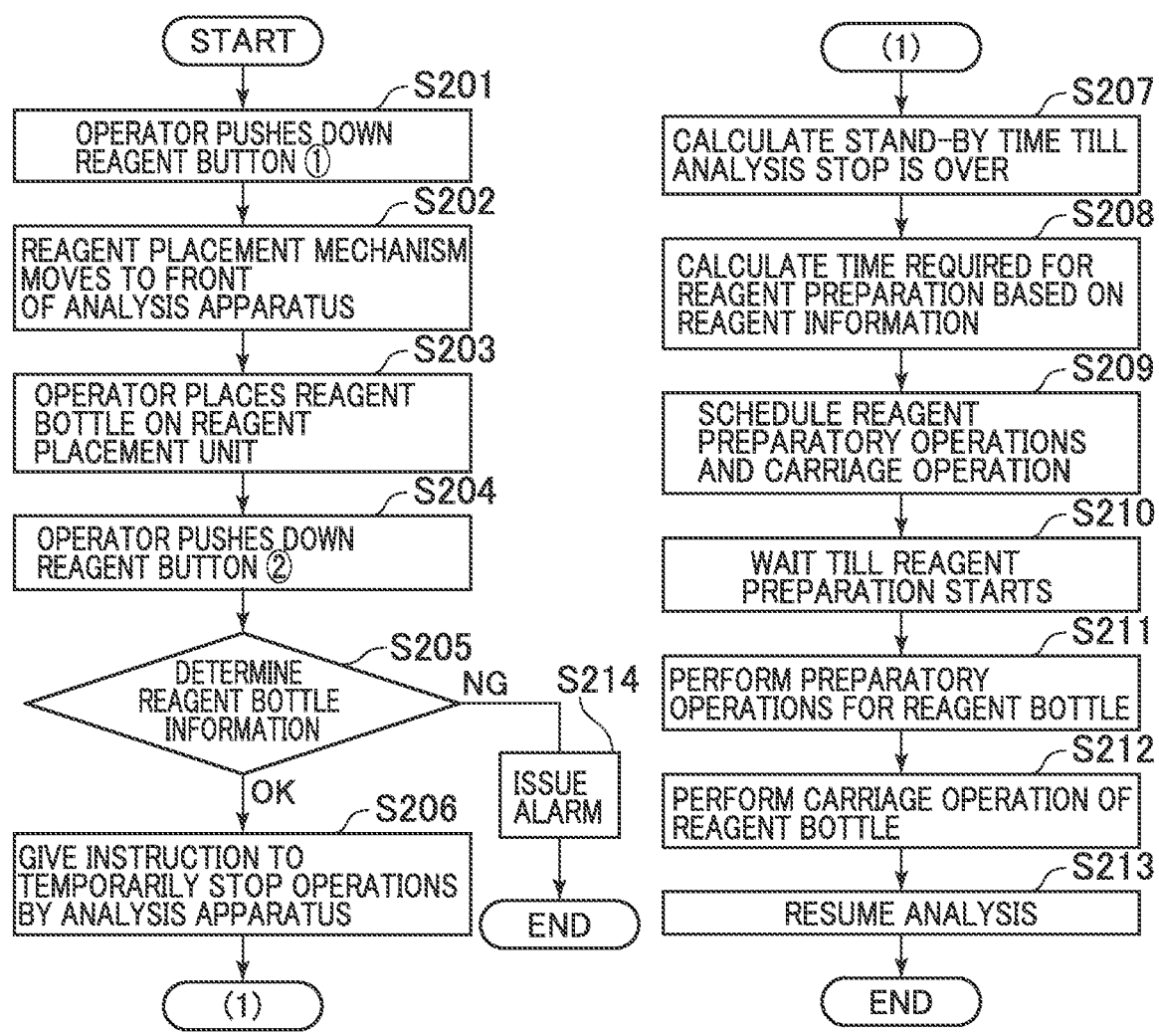
FIG. 5 is a flow chart to explain the reagent bottle carriage motion according to the automatic analyzer embodied in the present invention.

The reagent placement unit 103 is a part where an operator places a reagent bottle 10 when the reagent bottle 10 is carried in the automatic analyzer and moves vertically on a linear guide 119 by the reagent placement mechanism 102 in FIGS. 2 to 4. The operation range of the reagent placement unit 103 is arranged so that the reagent placement unit 103 may be contained in the automatic analyzer by being limited onto the metallic plate 118 at which the autoloader mechanism 100 is arranged.

Meanwhile, the number of the reagent placement unit 103 is not necessary to be one and it is also possible to retain a reagent bottle 10 carried to the reagent disk 9 and a reagent bottle 10 unloaded from the reagent disk 9 by different reagent placement units.

The reagent placement unit 103 is configured so as to be able to place a plurality of reagent bottles 10 linearly. For example, the reagent placement unit 103 is a tray that can hold multiple reagent bottles 10. A switch (recognition unit) 103a that is configured so as to be turned on when a reagent bottle 10 is placed is arranged on the plane of the reagent placement unit 103 where the reagent bottle 10 is placed.

The storage 110 is a space for retracting the reagent placement unit 103.

Returning to FIG. 2, the reagent carriage mechanism 101: is a mechanism for carrying a reagent bottle 10 placed in the reagent placement unit 103 into the reagent disk 9; and has the gripper mechanism 106 to grip a reagent bottle 10, a reagent bottle cover opening mechanism 104 to make a hole in the lid 112 of a reagent bottle 10, a vertical drive motor (not shown in the figure) to move the gripper mechanism 106 vertically, and a horizontal drive motor 131 to drive the gripper mechanism 106 and the reagent bottle cover opening mechanism 104 in the lateral direction in FIG. 2 as constituent components.

The bottle orientation detection sensor 114 and the RFID sensor 115 are arranged over the operation route of the reagent placement unit 103. The bottle orientation detection sensor 114 is a sensor to measure the installation or uninstallation and the installation orientation of a reagent bottle 10, detects the color of a label attached to the reagent bottle 10, and detects the orientation of the reagent bottle 10 placed in the reagent placement unit 103. The RFID sensor 115 obtains the information on a reagent in a reagent bottle 10 recorded in an RFID tag attached to the reagent bottle 10.

Here, the arrangement intervals of the RFID sensor 115, the bottle orientation detection sensor 114, the gripper mechanism 106, and the needle of the reagent bottle cover opening mechanism 104 are preferably set so as to be identical to the arrangement pitches of the reagent bottles 10 placed in the reagent placement unit 103 in order to improve throughput. The reason is that the operations of the gripper mechanism 106 and the needle sometimes can be started during detection by the bottle orientation detection sensor 114. That is, the reason is that the forward and backward movement of the reagent placement unit 103 can be reduced to the necessity minimum.

A needle to form a notch in the lid 112 of a reagent bottle 10 is attached to the reagent bottle cover opening mechanism 104. The reagent bottle cover opening mechanism 104 is configured so as: to clean the needle after a notch is formed in the lid 112 by the needle cleansing tank 108 arranged parallel with the operating direction of the reagent carriage mechanism 101; to remove rinse water by the needle drying port 109 arranged parallel with the operating direction of the reagent carriage mechanism 101 at the succeeding process; and not to dilute a reagent with the rinse water when a notch is formed in the lid 112 of a reagent bottle 10.

The gripper mechanism 106 has a hook nail to grip a reagent bottle 10, moves vertically by the rotating motion of the vertical drive motor, and grips the reagent bottle 10 by hooking the hook nail to the notched part of the reagent bottle 10, or performs detaching operation. In other words, the gripper mechanism 106 moves vertically by the vertical drive motor, grips a reagent bottle 10, ascends, moves laterally by the horizontal drive motor 131 after the ascend, descends at a predetermined position, and places the reagent bottle 10.

Further, the needle is also configured so as to form a hole in the lid 112 of a reagent bottle 10 by moving vertically by the rotating motion of a vertical drive motor.

In the present embodiment, at least one operation of cover opening operation of forming a hole by a needle installed in the reagent bottle cover opening mechanism 104, checking operation of an orientation by the bottle orientation detection sensor 114, checking operation of a content by the RFID sensor 115, and stirring operation is performed as preparatory operation necessary before a reagent bottle 10 starts to be used. Meanwhile, the preparatory operation is preparation for starting the use of a reagent and is not limited to the above operations. For example, checking operation of the amount of a reagent remaining in a reagent bottle 10, checking operation of impurities and bubbling, and other operations are named.

In the present embodiment, a reagent preparation unit for performing the reagent preparation stated above comprises the needle installed in the reagent bottle cover opening mechanism 104, the bottle orientation detection sensor 114, and the RFID sensor 115 and those components are arranged over a carriage line to carry a reagent bottle 10 to the reagent disk 9.

Meanwhile, reagent preparation is not necessarily arranged over the line and may also be arranged in the vicinity of the carriage line to carry a reagent bottle 10 to the reagent disk 9. Here, the vicinity means a position where preparatory operation is possible in the state of placing a reagent bottle 10 over the reagent placement unit 103 or in the state of gripping a reagent bottle 10 by the reagent carriage mechanism 101.

Further, the reagent preparation is not limited to being performed while a reagent bottle 10 is carried and can also be performed in a stopping state.

The above is the main configuration of the autoloader mechanism.

In the present embodiment, a carrier device to carry a reagent bottle 10 to the reagent disk 9 comprises the reagent placement unit 103, the reagent placement mechanism 102, and the reagent carriage mechanism 101.

Meanwhile, the carrier device may be any device as long as the device can carry a reagent bottle 10 from a place where an operator places the reagent bottle 10 in the analysis apparatus into the reagent disk 9 and may have any configuration as long as the device can move a reagent bottle 10. For example, a mechanism that can carry a plurality of reagent bottles 10 all at once like a conveyer can be adopted or a mechanism of carrying reagent bottles 10 one by one like a robot arm can be adopted.

Operations after a new reagent bottle 10 is placed until the reagent bottle 10 is carried to the reagent disk 9 using the autoloader mechanism 100 while the analysis apparatus analyzes a sample are explained hereunder in reference to FIG. 5 and other drawings.

In FIG. 5, when an operator wants to carry a new reagent bottle 10 to the reagent disk 9, firstly the operator pushes down a reagent button (not shown in the figure) of the analysis apparatus first time. As a result, the control unit 21 recognizes that the operator has pushed down the reagent button first time (Step S201). As a result, the control unit 21 operates the reagent placement mechanism 102 and moves the reagent placement unit 103 to the front of the analysis apparatus (lower part in FIG. 4) as shown in FIG. 4 (Step S202).

After the reagent placement unit 103 has arrived at the front of the analysis apparatus, the operator places a reagent bottle 10 in the reagent placement unit 103 (Step S203). After a necessary number of reagent bottles 10 have been placed in the reagent placement unit 103, the operator closes the cover and pushes down the reagent button again. As a result, the control unit 21 recognizes that the operator has pushed down the reagent button second time (Step S204).

For convenience of explanation here, the explanations are based on: a structure having five reagent slots capable of placing reagents in the reagent placement unit 103; and a state of an operator placing reagent bottles 10 in the front, the middle, and the rear of the reagent placement unit 103 and a space between adjacent two reagent bottles being a vacant reagent slot.

After the operator has recognized the pushdown of the button, the control unit 21 makes the reagent placement mechanism 102 operate, thus makes the reagent placement unit 103 pass through under the bottle orientation detection sensor 114 and the RFID sensor 115, and determines information held by the reagent bottle 10 (Step S205).

In the determination of information at Step S205: whether or not a reagent bottle 10 is placed is determined by the switch 103a; the orientation of the placement is determined by the bottle orientation detection sensor 114; an RFID is read by the RFID sensor 115; when all the determinations are judged as normal (OK), the processing advances to Step S206; when it is determined that there is an abnormality (NG), the reagent placement unit 103 is moved to the front of the analysis apparatus; an alarm is issued (Step S214) for notifying attention to an operator; and then the operation ended.

After the RFID information of all the reagent bottles 10 placed in the reagent placement unit 103 is determined as normal at Step S205, the control unit 21 gives an instruction to temporarily stop the analysis plan of the analysis apparatus in order to secure the timing of starting carriage (Step S206). The purpose is to inhibit unnecessary analysis stop because, if an operator intends to stop analysis in advance of the determination of the information of a reagent bottle 10, unnecessary analysis stop is performed and the analysis operation is affected when abnormality occurs in the reagent bottle 10.

Although the timing of stopping an analysis plan is set at an interval between samples that is the timing of completely finishing dispensing a currently dispensed sample at Step S206, the timing is not limited to an interval between samples and can be selected appropriately from conditions that act as the ends of various analysis plans, such as gaps between items, racks, rack groups, and the like, for example.

The time required to completely finish dispensing a currently dispensed sample and completely finish analyzing all the dispensed samples varies in accordance with the current analysis state and hence the control unit 21 obtains the required time by calculation (Step S207). As a result, the time required to temporarily stop analysis operation (time to finish "standby during analysis stop") is obtained.

Successively, the control unit 21 calculates a time required for reagent preparation from the RFID information obtained at Step S205 on the basis of preparatory operation necessary for each reagent bottle 10 and the characteristics of a reagent (Step S208). Here, the characteristics of a reagent indicate the characteristics held by the reagent such as the type, the degradability, and the volatility of the contained reagent.

At Step S208, firstly preparatory operation that can be performed during standby time is set. Here, a placed reagent bottle 10 requires the whole preparation and the preparatory operation includes cover opening operation and RFID writing operation to each reagent bottle 10. The control unit 21 calculates a time required for preparation from the necessary preparatory operation.

On this occasion, various times such as a time required for each preparatory operation, a time required to temporarily stop analysis operation, a time required for carriage, and a time required to restart analysis can be displayed on the display screen 22a of the display unit 22 and can be recognized by an operator.

Successively, the control unit 21 schedules reagent loading operation (Step S209). The control unit 21, as shown at TC3 in FIG. 6 for example, adjusts the timing of starting preparatory operation and matches the timing of finishing preparation with the timing of starting carriage so as to be able to carry a reagent bottle 10 to the reagent disk 9 immediately after the preparatory operation.

Further, on the basis of the time required to temporarily stop analysis operation (time to finish "standby during analysis stop"), which is obtained beforehand, the timing of starting preparatory operation is adjusted so that the timing of finishing preparation may match with the timing of finishing "standby during analysis stop".

Figure 6:
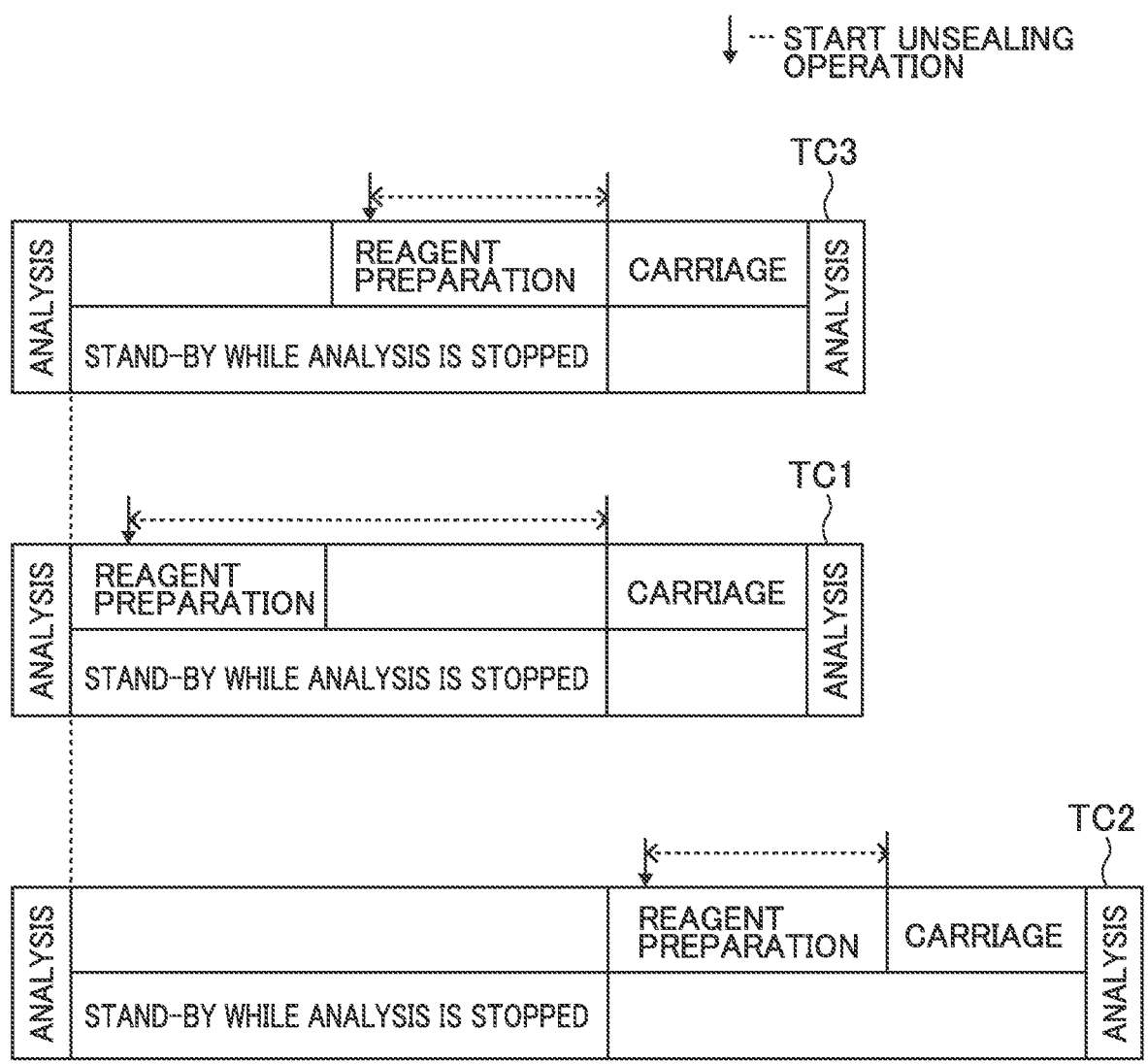
FIG. 6 is a view explaining the scheduling of the reagent preparation and the reagent bottle carriage according to the automatic analyzer embodied in the present invention.

In FIG. 6 here, the explanations are based on the case of carrying a reagent bottle 10 for convenience of explanation.

Meanwhile, TC1 and TC2 shown in FIG. 6 are scheduling results of carriage operation by known autoloaders. TC1 shown in FIG. 6 is a method of performing reagent preparation at the time of planning carriage and performing the carriage promptly when the carriage becomes possible. In TC1, the analysis stopping time can be reduced but the time from cover opening operation to carriage increases and hence deterioration and volatilization are concerned in some reagents.

Further, TC2 shown in FIG. 6 is a method of performing preparation after analysis stops and can reduce the time from cover opening to carriage. The analysis stopping time between analysis and analysis however is longer than those of TC1 and TC3. The problem therefore is that it takes time to finish whole analysis.

In contrast, according to TC3 of the present embodiment shown in FIG. 6, both the analysis stopping time and the time required from cover opening to carriage can be shorter than TC1 and TC2 and an optimum scheduling can be obtained.

Successively, the control unit 21 makes preparatory operation wait until reagent preparation start time for the lapse of time (Step S210) and makes reagent preparatory operation start for a necessary reagent bottle 10 at the timing scheduled at Step S209 (Step S211). At Step S211, cover opening operation and RFID writing operation are performed for the necessary reagent bottle 10.

After the reagent preparatory operation finishes, the control unit 21 moves the reagent placement unit 103 to a position below the gripper mechanism 106 (Step S212) in accordance with the scheduling at Step S209.

Here, at this time, the dispensing of a reagent finishes already, the operation (rotation) of the reagent disk 9 finishes, and the reagent disk 9 stops. A reagent bottle therefore is in the state of being able to be carried to the reagent disk 9.

Specifically, as shown in FIG. 7, the reagent placement mechanism 102 operates the reagent placement unit 103 and moves an unsealed reagent bottle 10 at a position below the gripper mechanism 106. Successively, the gripper mechanism 106 descends, grips the reagent bottle 10, and then opens the open/close cover 113. The gripper mechanism 106 rises at almost the same timing as the open/close cover 113 opens and moves to the position of the opened open/close cover 113. The gripper mechanism 106 carries the gripped reagent bottle 10 to a vacant position of the reagent disk 9. After the carriage, the gripper mechanism 106 returns to a position where a reagent bottle 10 is gripped. Further, the open/close cover 113 is closed almost simultaneously with or in parallel with closing the open/close cover 113.

After all the reagent bottles 10 that are placed in the reagent placement unit 103 and are required to be carried are carried to the reagent disk 9, the operation of the autoloader mechanism 100 finishes and analysis operation restarts (Step S213).

The above is the main carriage operation of reagent bottles 10 by the autoloader.

Meanwhile, although the above explanations have been made on the assumption that the timing of finishing "standby during analysis stop" is the timing of finishing the whole analysis of all the dispensed samples, the timing of finishing "standby during analysis stop" may also be defined as the timing of finishing dispensing all the reagent to all the dispensed samples.

Since the reagent disk 9 is in the state of stopping when the dispensing of all the reagents finishes, a reagent bottle can be carried to the reagent disk 9 earlier than the timing of finishing analysis. On this occasion, the control unit 21 should obtain a time required to finish dispensing all reagents (time to finish "standby during analysis stop") by calculation at Step S207.

Meanwhile, it is possible to exchange the execution order between Steps S206 and S207 and Step S208.

Further, when it is judged that there is no sample to be analyzed after the timing of stopping including there is no sample to be analyzed after a currently dispensed sample, the control unit 21, without giving an instruction to temporarily stop the analysis plan of the analysis apparatus at Step S206, obtains a time required to finish the analysis plan at Step S207, performs scheduling at Steps S208 and S209 so that the carriage of a reagent bottle 10 may start after the analysis of the relevant sample finishes, and performs the operations of Steps S210 to S212.

When a reagent bottle 10 placed in the reagent disk 9 is carried outside the analysis apparatus, basically the operation is opposite to the operation of carry-in and a known method is used for example. The timing of carrying out a reagent bottle 10 may be during analysis, after the finish of last dispensing, or after the output of an analysis result.

Details of the scheduling at Step S209 in FIG. 5 are explained hereunder.

Information on scheduling comprises mainly three and they are preparatory operation necessity information of each reagent bottle 10, characteristics of each reagent, and setting by an operator. The former two can be obtained from reading the RFID of a reagent bottle 10 and information stored in a storage unit 21a of the control unit 21. Further, the latter one can be obtained as information inputted to the display screen 22a of the display unit 22 by an operator.

Firstly, in order to specify preparatory operation requiring scheduling, the preparatory operation necessity information of each reagent bottle 10 is checked. This is performed at Step S205 stated earlier. With respect to the specified preparatory operation, operation timing is decided by reagent characteristics and the setting of an operator.

As the timing of performing preparation, there are possibly two cases: during standby during analysis stop and immediately before carriage. TC4 shown in FIG. 8 is the case of performing the scheduling of TC3 shown in FIG. 6 by a plurality of reagent bottles 10. Specifically, as shown in FIG. 8, in TC4, after preparation to a reagent bottle A1 is performed, preparation to a reagent bottle A2 and preparation to a reagent bottle A3 are performed, and the timing of finishing the preparation to the reagent bottle A3 is matched with the analysis stop timing. Successively, from immediately after analysis stop, the reagent bottle A1 is carried and the reagent bottles A2 and A3 are carried sequentially.

In some reagent characteristics however, there is a case of desiring to perform cover opening operation immediately before carriage because the reagent is easy to deteriorate or volatilize. On such an occasion, the control unit 21 may desirably make a schedule so as to perform reagent preparation immediately before each carriage like T5 shown in FIG. 9. Specifically, as shown in FIG. 9, in TC5, the timing of finishing preparation to a reagent bottle D1 is matched with the analysis stop timing. Successively, the carriage of the reagent bottle D1 is performed from immediately after the analysis stop and successively preparation and carriage to a reagent bottle D2 and preparation and carriage to a reagent bottle D3 are performed.

Further likewise, there is a case of desiring to decide the carriage order of reagent bottles regardless of the positions of the reagent bottles 10 in the reagent placement unit 103 because a reagent is easy to deteriorate or volatilize. In the case of TC4 shown in FIG. 8, it is desirable to schedule the preparatory operation of a reagent bottle having such a characteristic more backward and the carriage of the reagent bottle more frontward. For example, when a reagent bottle C3 has to be carried with priority over other reagent bottles, like T6 shown in FIG. 10, it is desirable to: perform preparation to a reagent bottle B1 and preparation to a reagent bottle B2 in advance of the preparation to the reagent bottle C3; carry the reagent bottle C3 first in the carriage immediately after analysis stop; and successively perform the carriage of the reagent bottle B1 and the carriage of the reagent bottle B2.

Likewise, in a case similar to TC5 shown in FIG. 9, it is desirable to make scheduling more frontward. For example, like TC7 shown in FIG. 11, the timing of finishing preparation to a reagent bottle F is matched with analysis stop timing. Successively, the reagent bottle F is carried immediately after the analysis stop and successively preparation and carriage to a reagent bottle E1 and preparation and carriage to a reagent bottle E2 are performed.

Meanwhile, although the explanations have been made in TC6 and TC7 on the basis of the case of adjusting the order of preparatory operation and carriage from information that a reagent is easy to deteriorate or volatilize, adjustment items are not limited to reagent characteristics such as the deterioration or volatilization of a reagent and order can be adjusted by information such as a measurement item of a sample (priority is given to a reagent bottle that is highly required to be carried with priority) and designation by an operator.

Further, although the timing of finishing preparatory operation is defined as the timing of finishing whole preparatory operation for example, besides this, immediately before the gripper mechanism 106 grips a reagent bottle 10, the timing where a reagent bottle 10 is waiting above the open/close cover 113, immediately after the open/close cover 113 opens, and the like may be adopted. In other words, various timings can be adopted in the range that allows a carried reagent to be inhibited from deteriorating and analysis stop to be made as short as possible but the timing of finishing whole preparatory operation is desirable from the situation that the control program of a control system is adjusted easily and the like.

Further, the timing of being regarded as the stop of an analysis plan also may be various timings in the range that allows a carried reagent to be inhibited from deteriorating and analysis stop to be made as short as possible.

Furthermore, in cover opening operation of forming a hole by a needle, a reagent sticks to the needle and that may cause contaminations in some cases. On that occasion, cleaning is required for every cover opening operation. When there are circumstances such as a same lot of a same reagent however, it is possible to avoid cleaning and perform cover opening operations continuously by collectively performing cover opening operation in preparation.

For the reason, when there is operation requiring the operation of removing a reagent attaching to the reagent preparation unit in preparatory operation like cover opening operation and there are a plurality of reagent bottles 10 that allow preparatory operation to be performed without removing operation to be performed, the control unit 21 can make scheduling so as to continuously perform preparatory operations to such reagent bottles 10. For example, it is possible to continuously perform preparation to reagent bottles A1, A2, and A3 as shown in FIG. 8 or continuously perform preparation to reagent bottles B1 and B2 as shown in FIG. 10.

In the present embodiment, it is possible to: display a screen for performing setting the necessity of performing reagent preparation collectively during standby during analysis stop, setting carriage priority for each reagent bottle, and setting whether or not preparatory operation is collectively performed on the display screen 22a of the display unit 22; and perform the settings freely by an input of an operator. An example of setting items and setting screens is explained hereunder in reference to FIG. 12 and FIG. 13.

The control unit 21 can display such a selection screen 701 as shown in FIG. 12 on the display screen 22a of the display unit 22. In the selection screen 701, a checkbox 702A for selecting the necessity of scheduling (TC4 shown in FIG. 8, TC5 shown in FIG. 9, TC6 shown in FIG. 10, and TC7 shown in FIG. 11) considering the priority of preparatory operation to a reagent bottle 10, a checkbox 702B for selecting the necessity of continuous scheduling of removal operations, an OK button 703, and a cancel button 704 are arranged.

When scheduling considering priority is required, the OK button 703 is selected in the state of checking the checkbox 702A. When scheduling considering priority is not required, the OK button 703 is selected in the state of unchecking the checkbox 702A.

Further, when continuous scheduling of removal operation is required, the OK button 703 is selected in the state of checking the checkbox 702B. When continuous scheduling of removal operation is not required, the OK button 703 is selected in the state of unchecking the checkbox 702B.

A first selection unit to select the necessity of scheduling considering the priority of preparatory operation comprises the checkbox 702A and the OK button 703. A third selection unit to select the necessity of continuous scheduling of removal operation comprises the checkbox 702B and the OK button 703.

Further, the control unit 21 can display such a selection screen 711 as shown in FIG. 13 on the display screen 22a of the display unit 22. In the selection screen 711, checkboxes 712 to set the priority of preparatory operation to each reagent bottle 10, an OK button 713, and a cancel button 714 are arranged. It is desirable to display the selection screen 711 when the OK button 703 is selected while the checkbox 702A is checked.

When the priority of preparatory operation to a reagent bottle 10 is required to be set, the OK button 713 is selected in the state of checking the checkbox 712 next to a reagent name requiring setting. To a reagent not required to set priority, the OK button 713 is selected in the state of unchecking the checkbox 712 next to a reagent name.

A second selection unit to set the priority of preparatory operation to each reagent bottle 10 comprises the checkboxes 712 and the OK button 703.

The control unit 21 schedules preparatory operation on the basis of whether or not the checkboxes 702A, 702B, and 712 are checked.

The effects of the present embodiment are explained hereunder.

The automatic analyzer stated above according to the present embodiment has: the light source 4a and the spectrophotometer 4 to perform measurement; the reagent disk 9 to store a reagent bottle 10 containing a reagent; the carriage device to carry a reagent bottle 10 to the reagent disk 9; the reagent preparation unit to perform necessary preparatory operation before a reagent bottle 10 starts to be used; and the control unit 21 to schedule preparatory operation by the reagent preparation unit and carriage by the carriage device so that the reagent bottle 10 may be carried to the reagent disk 9 immediately after the suspension or the finish of operation accompanied by analysis by the light source 4a and the spectrophotometer 4.

On the basis of such a configuration, it is possible to: match the timing of finishing preparatory operation performed before a reagent bottle 10 is carried with immediately after the suspension or the finish of operation accompanied by analysis; inhibit a carried reagent more than before from deteriorating when the reagent is carried automatically into the analysis apparatus; and perform optimum scheduling with analysis stop made as short as possible.

Further, since the operations of various mechanisms of the automatic analyzer related to the carriage of a reagent bottle 10 finish when the dispensing of a reagent finishes, the time of analysis operation stop can be reduced more by matching immediately after suspension or immediately after finish with the timing of finishing dispensing a reagent from a reagent bottle 10 and more efficient analysis becomes possible.

Furthermore, the automatic analyzer performs a plurality of analysis processes in parallel by adopting pipeline processing. That is, a processing capacity improves by operating a constant analysis cycle repeatedly. As a result, the operations of the various mechanisms in the automatic analyzer are linked in order to avoid interference and the like within one analysis cycle and it is sometimes not desirable to change start or stop of operation of one mechanism within one cycle. By matching immediately after suspension or immediately after finish with the timing of finishing the analysis of all the already dispensed samples that is an end of an analysis plan of samples therefore, it is possible to inhibit a carried reagent more than before from deteriorating and perform optimum scheduling with analysis stop made as short as possible while the adjustment of the operations of the various mechanisms in the automatic analyzer is minimized.

Moreover, by further installing the checkbox 702A and the OK button 703 to select the necessity of scheduling considering the priority of preparatory operation to a reagent bottle 10, it is possible to: perform preparatory operation and carriage operation to a reagent bottle 10 more suitable for the state of a reagent; and inhibit a reagent more effectively from deteriorating.

In addition, by further installing the checkbox 702B and the OK button 703 of setting the priority of preparatory operation to each reagent bottle 10, it is possible to: perform preparatory operation and carriage operation to a reagent bottle 10 yet more suitable for the state of a reagent; and inhibit a reagent yet more effectively from deteriorating.

Further, there are a plurality of reagent bottles 10 carried by the carriage device. In this case, by scheduling preparatory operation by the reagent preparation unit and carriage by the carriage device so as to be performed collectively to the multiple reagent bottles 10, even when the reagent bottles 10 are required to be carried at once, the control unit 21 can inhibit a carried reagent more than before from deteriorating, and perform the preparatory operation and the carriage to the reagent bottles 10 efficiently while analysis stop is made as short as possible.

Further, the control unit 21 can perform preparatory operation and carriage to a reagent bottle 10 efficiently while a reagent is inhibited more effectively from deteriorating by scheduling the preparatory operation backward and the carriage frontward to the reagent bottle 10 designated on the basis of the information of a reagent.

Moreover, when there are a plurality of reagent bottles 10 carried by the carriage device, also by performing preparatory operation by the reagent preparation unit and carriage by the carriage device to the multiple reagent bottles 10 alternately one by one and performing scheduling so that the carriage may be performed after the finish of the first preparation, the control unit 21 can: inhibit a carried reagent more than before from deteriorating; and perform the preparatory operation and the carriage to the reagent bottles 10 efficiently while analysis stop is made as short as possible.

Further, when there is operation requiring removal operation of a reagent attaching to the reagent preparation unit in preparatory operation, by making scheduling so as to continuously perform preparatory operation to reagent bottles 10 allowing preparatory operation to be performed without performing the removal operation, the control unit 21 can reduce the time required for preparatory operation and hence inhibit a reagent more effectively from deteriorating.

Moreover, by further installing the checkbox 712 and the OK button 703 to select the necessity of continuous scheduling of removal operation, it is possible to provide an automatic analyzer having a high degree of operational freedom.

Further, by arranging the reagent preparation unit above the carriage line for carrying a reagent bottle 10 to the reagent disk 9 by the carriage device, it is possible to: perform preparatory operation efficiently; hence reduce the time required for the preparatory operation; and inhibit a reagent more effectively from deteriorating.

Furthermore, the control unit 21 makes it possible to carry a reagent bottle 10 rapidly by suspending an analysis plan at the timing of finishing analysis of all the currently dispensed samples.

In addition, because the switch 103a to recognize that a reagent bottle 10 is placed is further installed in the carriage device and the control unit 21 starts scheduling when the switch 103a recognizes that a reagent bottle 10 is placed, optimum carriage scheduling starts automatically by placing a reagent bottle 10 and hence the burden of an operator can be reduced.

<Other>

Meanwhile, the present invention is not limited to the above embodiment and can variously be modified and applied. The above embodiment is explained in detail in order to explain the present invention in an easy-to-understand manner and is not necessarily limited to an automatic analyzer having all the explained configurations.

LIST OF REFERENCE SIGNS 1 reaction disk
2 reaction vessel
3 cleansing mechanism
4 spectrophotometer
4a light source
5, 6 stirring mechanism
7, 8 reagent dispensing mechanism
7a, 8a reagent probe
9 reagent disk (reagent storage unit)
10 reagent bottle
11 sample dispensing mechanism
11a sample probe
13, 30, 31, 32, 33 cleansing tank
15 sample container
16 rack
17 sample carriage mechanism
18 syringe for reagent 19 syringe for sample
20 cleansing pump
21 control unit
21a storage unit
22 display unit
22a display screen
100 autoloader mechanism
101 reagent carriage mechanism (carriage unit)
102 reagent placement mechanism
103 reagent placement unit
103a switch (recognition unit)
104 reagent bottle cover opening mechanism
106 gripper mechanism
108 needle cleansing tank
109 needle drying port
110 storage
111 reagent probe suction port
112 cover
113 open/close cover
114 bottle orientation detection sensor
115 RFID sensor
117 stay
118 metallic plate
118A, 118B aperture
119 linear guide
131 horizontal drive motor
205 step
701, 711 selection screen
702A, 702B, 712 check box
703, 713 O.K. button
704, 714 cancel button

The invention claimed is:

1. An automatic analyzer, comprising:
an analysis system to perform measurement;
a reagent bottle containing a reagent;
a reagent storage unit to store the reagent bottle containing the reagent;
a carriage device to carry the reagent bottle to the reagent storage unit;
a reagent preparation unit to make preparatory operations required before the reagent bottle is used;
a reagent probe configured to dispense the reagent from the reagent bottle; and
a control unit programmed to:
schedule the preparatory operations by the reagent preparation unit and a carriage operation by the carriage device such that the reagent bottle is carried to the reagent storage unit immediately after an operation accompanied with an analysis by the analysis system is suspended or an end of the operation accompanied with the analysis by the analysis system,
wherein a timing immediately after the suspension or the end of the operation accompanied with the analysis corresponds to a timing of an end of dispensation of the reagent from the reagent bottle by the reagent probe.

2. The automatic analyzer according to claim 1,
wherein a timing immediately after the suspension or the end of the operation accompanied with the analysis corresponds to a timing of an end of an analysis plan of the sample.

3. The automatic analyzer according to claim 1, further comprising:
a display coupled to the control unit,
wherein the control unit is programmed to:
display, on the display a first selection interface to receive a selection of whether scheduling with priority of the preparatory operations for the reagent bottle taken into account is required, and
schedule the preparatory operations based on the selection received via the first selection interface.

4. The automatic analyzer according to claim 3,
wherein the control unit is programmed to:
display, on the display, a second selection interface to receive a selection to set the priority of the preparatory operations for the reagent bottle to each of the reagent bottles, and
schedule the preparatory operations based on a setting result by the second selection interface.

5. The automatic analyzer according to claim 1,
wherein when there are a plurality of reagent bottles to be carried by the carriage device, the control unit is programmed to generate the scheduling such that the preparatory operations by the reagent preparation unit and the carriage by the carriage device are performed simultaneously for the plural reagent bottles.

6. The automatic analyzer according to claim 5,
wherein the control unit is programmed to schedule the preparatory operations of the reagent bottle designated based on information of the reagent posterior to the carriage operation.

7. The automatic analyzer according to claim 1,
wherein the control unit is programmed to when there are a plurality of reagent bottles to be carried by the carriage device, generate the scheduling such that the preparatory operations by the reagent preparation unit and the carriage by the carriage device are alternatively performed for each of the plural reagent bottles and the carriage is carried out firstly after the preparatory operations are completed.

8. The automatic analyzer according to claim 1,
wherein the control unit is programmed to when there is an operation required for removing the reagent attached on the reagent preparation unit in the preparatory operations, generate the scheduling such that the preparatory operations are continuously performed for the reagent bottles to which the preparatory operations are feasible without removing the reagent.

9. The automatic analyzer according to claim 8,
wherein the control unit is programmed to:
display, on the display, a third selection interface to select whether the scheduling is required such that the removing operations are continuously performed, and
schedule the preparatory operations based on selection result by the third selection interface.

10. The automatic analyzer according to claim 1,
wherein the reagent preparation unit is disposed on a carriage line of the carriage device through which the reagent bottle is carried to the reagent storage unit.

11. The automatic analyzer according to claim 1, further comprising:
a switch configured to switch when the reagent bottle is disposed on the carriage device,
wherein the control unit is programmed to start the scheduling upon being recognized by the recognition unit that the reagent bottle is disposed.

12. The automatic analyzer according to claim 1,
wherein the reagent preparation unit is configured to perform at least any one of stirring, and content checking operations which are required upon starting to use the reagent bottle.

13. The automatic analyzer according to claim 2,
wherein the control unit is programmed to suspend the analytical planning at timing when the analysis of the reagent being dispensed is completed.

14. The automatic analyzer according to claim 1,
wherein the carriage device includes a placement unit on which the plurality of reagent bottles are individually and respectively placed when the reagent bottles are carried to the reagent storage unit, and a placement mechanism to move the placement unit, and
wherein the gripper grips the respective reagent bottles placed on the placement unit to carry the reagent bottles to the reagent storage unit.

15. The automatic analyzer according to claim 1,
wherein the control unit is programmed to schedule the preparatory operation by the reagent preparation unit so as to match the end timing of the preparatory operation with the timing of starting carriage by the carriage device and makes the preparatory operation standby until the start time of the scheduled preparatory operation.

16. The automatic analyzer according to claim 1,
wherein the reagent carriage device includes a gripper having a hook nail configured to grip the reagent bottle, a reagent bottle cover opener having a needle configured to open a lid of the reagent bottle, a vertical drive motor configured to move the gripper vertically, and a horizontal drive motor configured to move the gripper horizontally,
wherein the regent preparation unit includes a bottle orientation detection sensor,
wherein the control unit is programmed to:
perform the preparatory operations including determining, based on the bottle orientation detection sensor, the orientation of the reagent bottle according to the schedule of the preparatory operations, and
perform the carriage operation by the carriage device including causing the gripper to grip the reagent bottle and driving the vertical drive motor and the horizontal drive motor to move the gripper, and opening the cover of the reagent bottle using the needle according to the schedule of the carriage operation, and
wherein the carriage device and the reagent preparation unit are disposed above the reagent storage unit.

* * * * *